United States Patent [19]

Nordin et al.

[11] Patent Number: 4,934,716
[45] Date of Patent: Jun. 19, 1990

[54] PIPE SEALING RING AND METHOD OF MANUFACTURING THE SAME

[75] Inventors: Olof Nordin, Prinscatan; Sohen Forsberg, Smultronvägen; Nils-Erik Bohman, Fakestad, all of Sweden

[73] Assignee: Forsheda Gummifabrik AB, Forsheda, Sweden

[21] Appl. No.: 854,671

[22] Filed: Apr. 18, 1986

Related U.S. Application Data

[63] Continuation of Ser. No. 715,060, Mar. 22, 1985, abandoned, which is a continuation of Ser. No. 636,064, Jul. 30, 1984, abandoned, which is a continuation of Ser. No. 332,880, Dec. 21, 1981, abandoned, which is a continuation of Ser. No. 162,940, Jun. 25, 1980, abandoned, which is a continuation of Ser. No. 000,021, Jan. 2, 1979, abandoned.

[30] Foreign Application Priority Data

Jan. 11, 1978 [SE] Sweden .............................. 7800282

[51] Int. Cl.⁵ ............................................. A63B 57/00
[52] U.S. Cl. .................................. 277/207 A; 285/230; 285/231
[58] Field of Search ................... 277/1, 34, 34.3, 34.6, 277/152, 153, 165, 168–172, 186, 205, 190, 206 R, 207 R, 207 A, 207 B, 226, 208–210, 215; 251/214, 306; 285/94, 110, 230, 231, 345, DIG. 11

[56] References Cited

U.S. PATENT DOCUMENTS

| | | | |
|---|---|---|---|
| 3,510,140 | 5/1970 | Hermann | 277/207 A |
| 3,592,481 | 7/1971 | Jeffery et al. | 277/207 A |
| 3,891,224 | 6/1975 | Ditcher | |

FOREIGN PATENT DOCUMENTS

| | | | |
|---|---|---|---|
| 682728 | 3/1964 | Canada | 277/1 |
| 530016 | 7/1931 | Fed. Rep. of Germany | 277/207 A |
| 1939779 | 9/1970 | Fed. Rep. of Germany | 277/207 A |
| 378357 | 7/1964 | Switzerland | 277/1 |
| 890775 | 3/1962 | United Kingdom | 277/207 A |
| 1260263 | 1/1972 | United Kingdom | 285/110 |

*Primary Examiner*—William A. Cuchlinski
*Attorney, Agent, or Firm*—Jeffers, Hoffman & Niewyk

[57] ABSTRACT

A sealing ring for sealing a space between two concentric sealing surfaces engageable one inside the other comprising first and second sealing portions each having a sliding surface. The sealing portions engage each other at the sliding surfaces and upon insertion one of the sealing surfaces in the other sealing surface each and to side against each other along the sliding surfaces which are preferably provided with lubricant. In the sealing ring illustrated, one of the sealing portions has a substantially conical sliding surface and the other sealing portion is connected with the first sealing portion and from that point of connection extends along the conical sliding surface so that the second sealing portion covers substantially the whole conical sliding surface in the starting position for inserting one of the sealing surfaces into the other.

4 Claims, 3 Drawing Sheets

PIPE SEALING RING AND METHOD OF MANUFACTURING THE SAME

This application is a continuation of application Ser. No. 715,060, filed Mar. 22, 1985, which was in turn a continuation of application Ser. No. 636,064, filed July 30, 1984, which was in turn a continuation of application Ser. No. 332,880, filed Dec. 21, 1981, which was in turn a continuation of application Ser. No. 162,940, filed June 25, 1980, which was in turn a continuation of application Ser. No. 000,021, filed Jan. 2, 1979, all of which are now abandoned.

BACKGROUND OF THE INVENTION

The present invention relates to a sealing ring which consists of an elastic material, preferably rubber, for sealing the space between two sealing surfaces which are axially displacable to a substantially concentric position in relation to each other, preferably for sealing the space between a socket and a spigot of a pipe joint, and a method of manufacturing such a sealing ring.

Sealing rings for sealing the annular space between a socket and a spigot in a pipe joint are of two main types, rolling rings and sliding rings. In a conventional sliding ring joint the sliding action takes place between the sealing ring and at least one of the sealing surfaces when the sealing surfaces are axially displaced in relation to each other. In order to reduce the friction forces between the ring and the sealing surface at which the sliding takes place it is necessary to apply a lubricant on the sealing ring. However, sealing rings of the above type have certain drawbacks. Thus, it is a time consuming and unpleasant work to apply the lubricant and there is also the risk of pollution of the surfaces provided with lubricant after the positioning of the sealing ring in the starting position for the axial displacement of the sealing surfaces to the concentric position.

SUMMARY OF THE INVENTION

The object of the invention is to provide an improved sealing ring of the sliding type.

According to the invention there is provided a sealing ring for sealing a space between two substantially concentrical sealing surfaces which are insertable one in the other, comprising two sealing portions each having a sliding surface, said sealing portions engaging each other at said sliding surfaces and being adapted at the insertion of one of the sealing surfaces in the other sealing surface substantially indisplacably to engage one sealing surface each and to slide against each other along said sliding surfaces, which preferably are provided with a lubricant.

Preferably one of said sealing portions has a substantially conical sliding surface and the other sealing portion is connected with the first sealing portion and from the point of connection extends along the conical sliding surface so that the second sealing portion covers substantially the whole conical sliding surface in the starting position for inserting one of said sealing surfaces into the other sealing surface.

It is preferred that the second sealing portion has a relatively small thickness so that it extends over the conical sealing surface in close conformity thereto as a thin and flexible covering.

The invention also relates to a method of manufacturing a sealing ring having two sealing portions connected with each other, each sealing portion having a sealing surface adapted to contact the sealing surface of the outer sealing portion, the section of the sealing ring being manufactured from a vulcanizable material which is vulcanized after the manufacturing of the section. The method according to the invention is characterized in that the section of the ring is formed with the sliding surfaces of the sealing portions positioned at a distance from each other, that a first stage of the vulcanization is conducted with the sliding surfaces at a distance from each other and a second stage of the vulcanization is conducted with the sliding surfaces positioned adjacent each other so that the sliding surfaces are positioned adjacent each other without sticking to each other in the finally vulcanized condition of the section.

In a sealing ring according to the present invention there is provided a pocket for receiving a lubricant between the sliding surfaces. The lubricant can be supplied to the pocket in any desired manner and at any desired stage. In all cases there is obtained the advantages that the lubricant and the sliding surfaces are protected from dirt and that the lubricant is retained on the sliding surfaces.

BRIEF DESCRIPTION OF THE DRAWINGS

The invention is described in the following with reference to the accompanying drawings.

DESCRIPTION OF PREFERRED EMBODIMENTS

Figure 1:
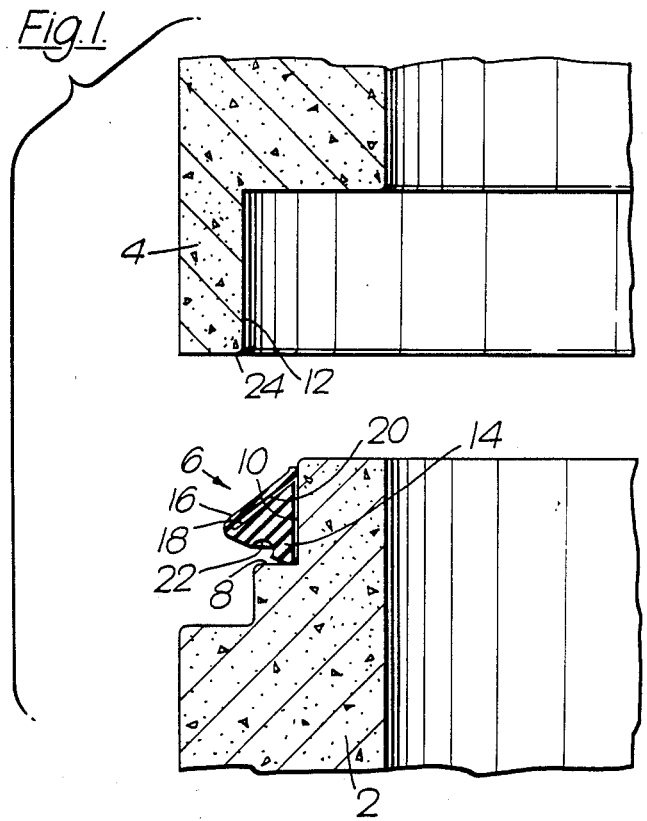
FIG. 1 is an axial section of a sealing ring according to the invention positioned on the spigot end of a pipe.
Figure 2:
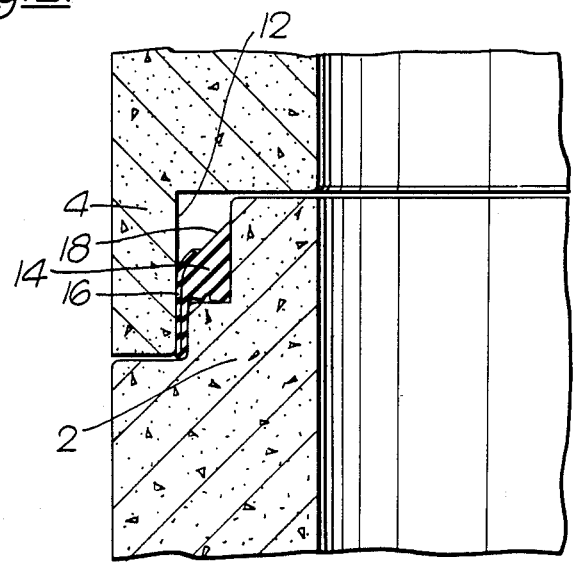
FIG. 2 is a section corresponding to the section according to FIG. 1 after the spigot end provided with the sealing ring has been inserted into a socket.

In FIG. 1 there is shown male and female members in the form of a spigot end 2 and a socket end 4 of two well rings which shall be sealingly connected with each other by means of a sealing ring 6 according to the invention. The sealing ring 6 rests on a shoulder 8 of the spigot end 2 and the sealed joint is provided by lowering the well ring provided with the socket 4 onto the spigot end 2 so that the sealing ring is compressed between a sealing surface 10 of the spigot end and a sealing surface 12 of the socket end. This arrangement provides axially spaced, circumferentially extending sealing portions 10a, 10b, which are of a smaller diameter than the sealing surface 12 to define as illustrated in FIG. 2 a first enlarged pocket for the body portion of the sealing ring and a smaller contiguous pocket for the lip portion of the sealing ring.

The sealing ring 6 consists of two portions connected with each other, a main annular body portion 14 having a substantially triangular section and a relatively thin portion 16 in the form of a flexible lip which is connected with the portion 14 at the base thereof and extends up along the whole height of the portion 14. Preferably the portion 16 has a thickness of 0.2-1.2 mm. The surfaces 18 and 20 of the portions 14 and 16, respectively, opposing each other constitute sliding surfaces which in the position shown in FIG. 1 form a pocket. In the pocket formed by the surfaces 18 and 20 there is a lubricant which shall promote the sliding between the surfaces 18 and 20 for facilitating the mounting of the joint. In order to facilitate the compression of the main portion 14 of the sealing ring the main portion is provided with a recess 22 at the thickest portion of the section thereof. The sealing lip 16 is connected to the apex of the body portion 4 of the sealing ring and overlies the frusto-conical sliding surface 18 thereof so that the terminal edge of the sealing lip 16 is disposed adjacent the edge of the base 4a at the juncture of the base and sliding surface 18.

When the joint is mounted the upper well ring is lowered onto the lower well ring, the edge 24 of the socket 4 of the upper well ring contacting the outer surface of the thin sealing portion 16 of the sealing ring 6. At the continued movement of the upper well ring downwards the thin portion 16 follows the movement of the upper well ring while a sliding action takes place between the surfaces 18 and 20. Because of the fact that there is a lubricant between the surfaces 18 and 20 the sliding motion during the mounting of the joint takes place substantially without any friction resistance and only against the action of the force required for compressing the sealing ring 6. Finally the spigot end 2 and the socket end 4 take the position in relation to each other as shown in FIG. 2, wherein the sealing ring 6 is compressed between the sealing surfaces 12 and 14 for sealing the joint between the well rings in a reliable way.

It is recognized that the sealing ring 6 can be delivered to the place where the ring shall be used with the lubricant applied in the pocket between the surfaces 18 and 20. Thereby, the lubricant and the sliding surfaces 18 and 20 are during the whole stage of the mounting from the positioning of the sealing ring on the spigot end until the final mounting position has been reached protected from dirt which can disturb a correct sliding motion. Of course it is also possible to apply the lubricant at the place where the sealing ring is to be used. Also in this case there is obtained a protection for the sliding surfaces and the lubricant with regard to dirt because of the fact that the lubricant and the sliding surfaces are positioned in the protecting pocket. In order to facilitate the supplying of the lubricant to the pocket it is possible to use a special device, which for example includes a nozzle in the form of an elongated body having lateral openings, which device is introduced into the pocket whereupon the lubricant is forced out through the openings in order to be supplied to the sliding surfaces 18 and 20.

Figure 3:
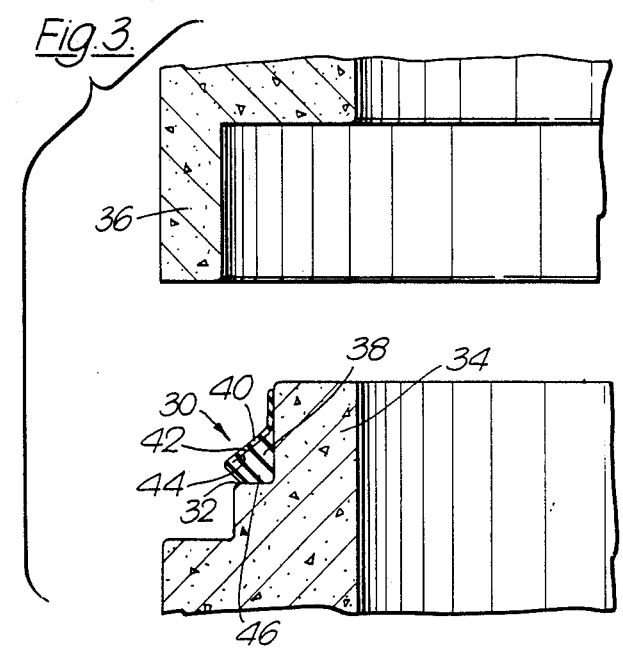
FIG. 3 is a section corresponding to FIG. 1 of a second embodiment of a sealing ring positioned on a spigot end of a pipe.

In FIG. 3 there is shown a second embodiment of a sealing ring 30 according to the present invention. The sealing ring 30 rests on a shoulder 32 of a spigot end 34 constituting the upper end of a well ring. The well ring is to be connected with a socket end 36 of a well ring positioned above the first mentioned well ring. The sealing ring 30 has a main portion 38 with a substantially triangular section and a relatively thin portion 40 connected with the main portion 38. The thin portion 40 extends upwardly from the thickest portion of the portion 38 along the whole height of the sealing ring 30. Also in this case there are formed two opposite sliding surfaces 42 and 44 on the portions 38 and 40, respectively. The pocket constituted by the surfaces 42 and 44 contains a lubricant in order to promote the sliding between the said surfaces. The sealing ring 30 according to FIG. 3 differs from the sealing ring 6 according to FIG. 1 only in the respect that it is provided with a lower portion 46 by means of which the sealing surface rests on the shoulder 32.

Figure 4:
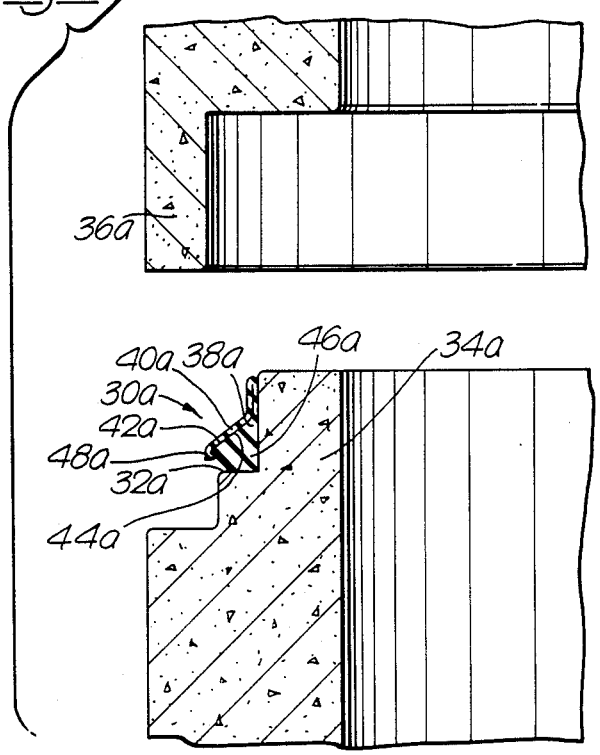
FIG. 4 is a section corresponding to the sections of FIGS. 1 and 3 of a further embodiment of a sealing ring positioned on a spigot end.

In FIG. 4 there is shown a sealing ring which is designed in substantially the same way as the sealing ring according to FIG. 3 with the difference that the thin portion of the ring is connected with the main portion of the ring at the upper end instead of the lower end thereof. The sealing ring according to FIG. 4 and the spigot end and the socket end which the sealing ring is adapted to seal in relation to each other are therefore provided with the same reference numerals as according to FIG. 3 with the appendix a. At its free edge the sealing portion 40a is provided with an inwardly directed projection 48 which provides for a determination of the position of the free edge of the thin portion 40c in relation to the point of the triangular portion 38a. As to the function the sealing ring according to FIG. 4 acts in the same way as the sealing rings according to FIGS. 1, 2 and 3.

Figure 5:
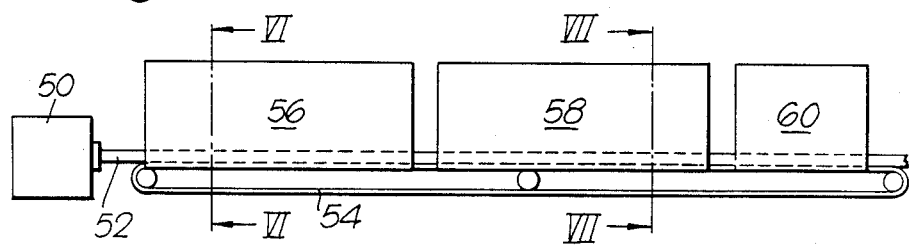
FIG. 5 schematically shows a plant for manufacturing a sealing ring according to the invention.
Figure 6:
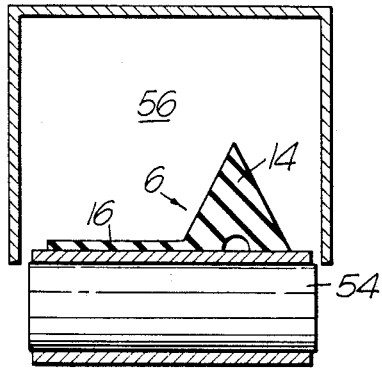
FIG. 6 is a section on an enlarged scale on line VI—VI of FIG. 1.
Figure 7:
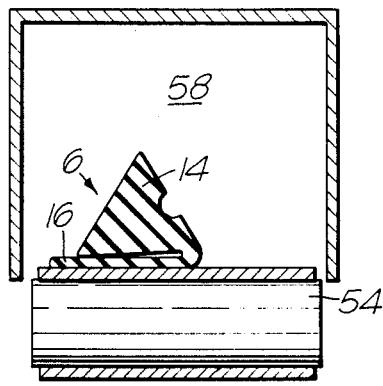
FIG. 7 is a section on an enlarged scale on line VII—VII of FIG. 5.

FIG. 5 schematically shows a plant for manufacturing sealing rings of the types shown in FIGS. 1-4. From an extruder 50 there is extruded a strand 52 consisting of a rubber and having the sectional shape shown in FIG. 6. Thus, the section includes a substantially triangular main portion 14 and a thin portion 16 extending in the same direction as the base of the triangular portion. From the extruder 50 the strand 52 is delivered to a conveyor belt 54 which conveys the strand through a first vulcanization chamber 56 wherein the first stage of the vulcanization takes place with the strand 52 in the position shown in FIG. 6. During the first stage of the vulcanization the strand is vulcanized to such a degree that the tackiness of the surface of the strand is removed. After having passed the vulcanization chamber 56 the strand enters into vulcanization chamber 58 wherein the second stage of the vulcanization takes place. In the vulcanizing chamber 58 the strand 52 has the position shown in FIG. 7, i.e. the triangular main portion 14 has been tilted down onto the thin portion 16 so that said portions take the position in relation to each other as shown in FIG. 1 in the chamber 58 during the second stage of the vulcanization. During the second stage of the vulcanization a fixing of the portions 14 and 16 in the correct position in relation to each other takes place, thereby no sticking between said portions taking place because of the fact that the first stage of the vulcanization has been conducted with said portions at a distance from each other. After the strand has left the chamber 58 the vulcanization is finished and the strand enters a chamber 60 wherein the strand is chilled. Thereupon the strand is in a conventional way divided into suitable lengths and the ends of the lengths are connected with each other for constituting sealing rings according to the invention. It is recognized that the manufacturing method described above can be used also for manufacturing sealing rings according to FIGS. 3 and 4.

The invention can be modified within the scope of the following claims.

We claim:

1. In a fluid-tight joint assembly, a unitary sealing ring for sealing a space between sealing surfaces of two members which are axially displaceable to an assembled position wherein they overlie one another, said sealing ring being mounted on one of said members and comprising an annular body portion having a first circumferential face confronting and substantially indisplaceably engaging the sealing surface of one of said members at all times during which the sealing ring is in contact with both members during assembly and a second face providing a sliding surface, a flexible sealing portion having a sliding surface completely overlying and engageable with the sliding surface of said second face in the relaxed position of said seal, said flexible sealing portion substantially indisplaceably engaging the sealing surface of the other of said members at all times during which the sealing ring is in contact with both members during assembly, and a lubricant on at least one of the confronting sliding surfaces of said sealing portion and second face, and wherein, upon axial displacement of said members, with the sealing ring in contact with both members, to an assembled position in which said first face of the body portion presses against the sealing surface of said one member and the outer face of the sealing portion presses against the sealing surface of said other member, said sliding surfaces are displaced axially relative to each other substantially to the same extent that said members are displaced relative to each other.

2. A sealing ring for sealing a space between two sealing surfaces of members which are axially displaceable to an assembled position wherein they overlie one another, said sealing ring adapted to be mounted on one of said members and comprising an annular body portion having a first circumferential face confronting and engaging the sealing surface of one of said members and a second face providing a sliding surface, a flexible sealing portion having a sliding surface completely overlying and engageable with the sliding surface of said second face in the relaxed position of said seal, a lubricant on at least one of the confronting sliding surfaces of said sealing portion and second face, said sliding surfaces displaceable relative to one another upon axial displacement of said members to an assembled position wherein said first face of the body portion presses against the sealing surface of said one member and the outer face of the sealing portion presses against the sealing surface of said other member, wherein said sealing portion is of a smaller cross section than said body portion and wherein one of the members has a socket end defining a cylindrical sealing surface and the other member has a spigot end having a step configuration defining an inner sealing surface and an outer sealing surface connected by a generally radially extending shoulder, said sealing ring being mounted initially on the inner sealing surface of said second member so that when the members are telescoped relative to one another, the edge of the socket end contacts the sealing portion to effect displacement of the sealing portion relative to the body portion to partially fold on itself and the sealing portion is compressed between the cylindrical sealing surface of said first member and said outer sealing surface of said second member.

3. A combination as claimed in claim 2, wherein a portion of said body portion and a portion of said sealing portion prior to assembly of said members projects radially beyond the outer sealing surface of said second member.

4. In a fluid-tight joint assembly, a unitary sealing ring for sealing a space between two substantially coaxial sealing surfaces which are insertable one in the other, comprising two sealing portions each having a sliding surface, the sealing portions engaging each other at the sliding surfaces and, throughout the insertion of one of the sealing surfaces into the other while the sealing ring is in contact with both sealing surfaces, the sealing portions substantially indisplaceably engaging one sealing surface each, and being slidable against each other along the sliding surfaces substantially to the same extent that the sealing surfaces are displaced relative to each other, wherein one of the sealing portions consists of a flexible and thin covering which covers substantially the whole sliding surface of the other sealing portion in the starting position for inserting one of the sealing surfaces into the other sealing surface.

* * * * *